(12) United States Patent
Ohno

(10) Patent No.: US 8,079,764 B2
(45) Date of Patent: Dec. 20, 2011

(54) LIGHT QUANTITY ADJUSTING DEVICE, LENS BARREL, IMAGE PICKUP DEVICE, AND METHOD OF CONTROLLING THE IMAGE PICKUP DEVICE

(75) Inventor: Naoyuki Ohno, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/658,985

(22) Filed: Feb. 18, 2010

(65) Prior Publication Data

US 2010/0220988 A1  Sep. 2, 2010

(30) Foreign Application Priority Data

Feb. 27, 2009  (JP) ................ P2009-047134

(51) Int. Cl.
*G03B 17/00* (2006.01)
*G03B 9/02* (2006.01)
(52) U.S. Cl. ...................... 396/439; 396/505
(58) Field of Classification Search ........... 396/505, 396/507, 510, 449, 242; 359/227, 233, 739
See application file for complete search history.

(56) References Cited

U.S. PATENT DOCUMENTS

| | | | | |
|---|---|---|---|---|
| 4,797,700 A * | 1/1989 | Tsuji et al. | | 396/508 |
| 5,159,382 A | 10/1992 | Lee et al. | | |
| 5,432,576 A * | 7/1995 | SanGregory et al. | | 396/449 |
| 5,502,525 A | 3/1996 | Mizoguchi | | |
| 6,340,252 B1 | 1/2002 | Kawano | | |
| 6,533,473 B1 * | 3/2003 | Edamitsu et al. | | 396/450 |
| 7,798,730 B2 * | 9/2010 | Westerweck | | 396/493 |
| 2004/0130653 A1 * | 7/2004 | Nanjo et al. | | 348/363 |
| 2007/0065135 A1 * | 3/2007 | Takei et al. | | 396/241 |
| 2007/0154207 A1 | 7/2007 | Saito et al. | | |
| 2009/0296183 A1 * | 12/2009 | Makii et al. | | 359/227 |

FOREIGN PATENT DOCUMENTS

| | | |
|---|---|---|
| JP | 02093438 A | 4/1990 |
| JP | 04013122 A | 1/1992 |
| JP | 05090458 A | 4/1993 |
| JP | 2002204391 A | 7/2002 |
| JP | 2003-344896 A | 12/2003 |
| JP | 2007140250 A | 6/2007 |

OTHER PUBLICATIONS

Office Action from Japanese Application No. 2009-047134, dated Nov. 11, 2010.
European Search Report EP 10154121 dated Jun. 15, 2010.

* cited by examiner

*Primary Examiner* — W. B. Perkey
*Assistant Examiner* — Noam Reisner
(74) *Attorney, Agent, or Firm* — Lerner, David, Littenberg, Krumholz & Mentlik, LLP

(57) ABSTRACT

A light quantity adjusting device includes a plate, an upper diaphragm blade, a lower diaphragm blade, and a diaphragm blade driving unit. The upper diaphragm blade has a semicircular upper main opening and a semicircular upper sub opening. The lower diaphragm blade has a semicircular lower main opening and a semicircular lower sub opening formed. The diaphragm blade driving unit is formed so as to be capable of switching between a state in which a circular main diaphragm opening is formed by the upper main opening and the lower main opening with an optical axis being the center and a state in which a circular sub diaphragm opening that is smaller than the main diaphragm opening is formed by the upper sub opening and the lower sub opening with the optical axis being the center.

1 Claim, 14 Drawing Sheets

LIGHT QUANTITY ADJUSTING DEVICE, LENS BARREL, IMAGE PICKUP DEVICE, AND METHOD OF CONTROLLING THE IMAGE PICKUP DEVICE

CROSS-REFERENCE TO RELATED APPLICATION

The present application claims priority from Japanese Patent Application No. JP 2009-047134 filed in the Japanese Patent Office on Feb. 27, 2009, the entire content of which is incorporated herein by reference.

BACKGROUND OF THE INVENTION

The present invention relates to a light quantity adjusting device including an upper diaphragm blade and a lower diaphragm blade, which are provided so that they can reciprocate; a lens barrel; an image pickup device; and a method of controlling the image pickup device.

2. Description of the Related Art

Hitherto, an image pickup device, such as a digital still camera or a digital video camera, forms an object image by an image pickup lens. An image is formed by an image pickup element, such as a complementary metal oxide semiconductor (CMOS) image sensor or a charged coupled device (CCD) image sensor, disposed at the back side of the lens.

Here, if an object is bright, in order to reduce the quantity of light incident upon the image pickup element, the light quantity is restricted by moving a diaphragm blade provided at a light quantity adjusting device.

However, if the shape of a diaphragm opening formed by the diaphragm blade is a rectangular shape (such as a rhombic shape), an out-of-focus image of the formed image also has a rectangular shape, thereby making worse the out-of-focus image.

Accordingly, in a light quantity adjusting device including two diaphragm blades and a neutral density (ND) filter, there is provided a technology in which a third blade that moves together with the ND filter is provided. In addition, a polygonal diaphragm opening having five or more angles is achieved by two diaphragm blades and the third blade to improve an out-of-focus image.

SUMMARY OF THE INVENTION

However, in the technology discussed in Japanese Unexamined Patent Application Publication No. 2003-344896, a diaphragm opening still has a rectangular shape. Therefore, it is not possible to provide a circular out-of-focus image in which the background or the foreground is blurred uniformly in all directions with respect to a main object.

Therefore, it is desirable to obtain a circular out-of-focus image that is generally evaluated as a good out-of-focus image.

The present invention can overcome the above-described problem by the following.

According to an embodiment of the present invention, there is provided a light quantity adjusting device including a plate having a circular opening portion for allowing light to be incident thereupon, the plate being disposed perpendicularly to an optical axis of the incident light from the opening portion; an upper diaphragm blade and a lower diaphragm blade, each blade being provided so as to be capable of reciprocating along a surface of the plate; and diaphragm blade driving means for reciprocating the upper diaphragm blade and the lower diaphragm blade in opposite directions to each other. The upper diaphragm blade has a semicircular upper main opening having a size corresponding to that of the upper half of the opening portion, the upper main opening opening upward; and a semicircular upper sub opening formed at a top portion of the upper main opening, the upper sub opening having a size that is smaller than that of the upper main opening, the upper sub opening opening upward. The lower diaphragm blade has a semicircular lower main opening having a size corresponding to that of the lower half of the opening portion and opening downward; and a semicircular lower sub opening formed at a bottom portion of the lower main opening, having a size that is the same as that of the upper sub opening, and opening downward. The diaphragm blade driving means is formed so as to be capable of switching between a state in which a circular main diaphragm opening is formed by the upper main opening and the lower main opening with the optical axis being the center and a state in which a circular sub diaphragm opening that is smaller than the main diaphragm opening is formed by the upper sub opening and the lower sub opening with the optical axis being the center.

According to another embodiment of the present invention, there is provided a lens barrel including an image pickup lens, a barrel body accommodating the lens, and the aforementioned light quantity adjusting device.

According to still another embodiment of the present invention, there is provided an image pickup device including an image pickup lens, a barrel body accommodating the lens, the aforementioned light quantity adjusting device, and an image pickup element disposed on the optical axis rearwardly of the plate of the light quantity adjusting means in an incidence direction.

According to still another embodiment of the present invention, there is provided a method of controlling an image pickup device. The image pickup device includes an image pickup lens; a barrel body that accommodates the lens; the light quantity adjusting device; an image pickup element disposed rearwardly of the plate of the light quantity adjusting device in an incidence direction on the optical axis; a neutral density filter provided so as to be capable of reciprocating along the surface of the plate, the neutral density filter reducing the quantity of light passing therethrough; neutral density filter driving means for reciprocating the neutral density filter; exposure value detecting means for detecting an exposure value; exposure value change predicting means for predicting a change in the exposure value in the future on the basis of a change in a past exposure value detected by the exposure value detecting means; and shutter speed adjusting means for adjusting a shutter speed between a low speed and a high speed. The neutral density filter driving means is formed so as to be capable of switching between a state in which the sub diaphragm opening is exposed and a state in which the sub diaphragm opening is covered with the neutral density filter. The controlling method includes the steps of:
  if the exposure value detected by the exposure value detecting means is equal to or less than a first reference value, forming the main diaphragm opening by the diaphragm blade driving means;
  in the case where the main diaphragm opening is formed, if the exposure value detected by the exposure value detecting means becomes greater than the first reference value and is equal to or less than a second reference value, changing the shutter speed from the low speed to the high speed by the shutter speed adjusting means;
  in the case where the main diaphragm opening is formed and the shutter speed is the high speed, if the exposure value change predicting means predicts that the exposure value will become greater than the second reference value in the future, setting the shutter speed from the high speed back to the low speed by the shutter speed adjusting means and forming the sub diaphragm opening by the diaphragm blade driving means;

in the case where the shutter speed is the low speed and the sub diaphragm opening is formed, if the exposure value detected by the exposure value detecting means becomes greater than the second reference value and is equal to or less than a third reference value, changing the shutter speed from the low speed to the high speed by the shutter speed adjusting means;

in the case where the sub diaphragm opening is formed and the shutter speed is the high speed, if the exposure value change predicting means predicts that the exposure value will become greater than the third reference value in the future, setting the shutter speed from the high speed back to the low speed by the shutter speed adjusting means and covering the sub diaphragm opening with the neutral density filter by the neutral density filter driving means; and in the case where the shutter speed is the low speed and the sub diaphragm opening is covered with the neutral density filter, if the exposure value detected by the exposure value detecting means is greater than the third reference value, changing the shutter speed from the low speed to the high speed.

Each of the above-described embodiments is provided with an upper diaphragm blade and a lower diaphragm blade provided so that they can reciprocate. In addition, the upper diaphragm blade includes a semicircular upper main opening and a semicircular upper sub opening. The upper main opening opens upward. The upper sub opening is formed at the top portion of the upper main opening, is smaller than the upper main opening, and opens upward. The lower diaphragm blade includes a semicircular lower main opening and a semicircular lower sub opening. The lower main opening opens downward. The lower sub opening is formed at the bottom portion of the lower main opening, has the same size as the upper sub opening, and opens downward.

Here, the diaphragm blade driving means is formed so as to allow switching between the state in which the circular main diaphragm opening is formed by the upper main opening and the lower main opening and the state in which the circular sub diaphragm opening that is smaller than the main diaphragm opening is formed by the upper sub opening and the lower sub opening.

Therefore, it is possible to switch between the main diaphragm opening and the sub diaphragm opening in accordance with an exposure value. In addition, the circular main diaphragm opening and the circular sub diaphragm opening are obtained.

According to the embodiments of the present invention, it is possible to adjust the exposure value by switching between the main diaphragm opening and the sub diaphragm opening. In addition, it is possible to obtain a good circular out-of-focus image by the circular main diaphragm opening and the circular sub diaphragm opening.

DESCRIPTION OF THE PREFERRED EMBODIMENTS

Embodiments for carrying out the present invention will hereunder be described with reference to the drawings.

Here, an image pickup device according to each of the embodiments of the present invention below is a digital still camera 10 or a digital video camera 100. A lens barrel according to an embodiment of the present invention corresponds to a lens barrel 20 built in the digital still camera 10. Further, a light quantity adjusting device according to an embodiment of the present invention corresponds to a light quantity adjusting device 30 built in the lens barrel 20.

The description will be given in the following order:
1. First embodiment (image pickup device: example is digital still camera)
2. Second embodiment (image pickup device: example is digital video camera)

1. First Embodiment

Exemplary Appearance of Image Pickup Device

Figure 1:
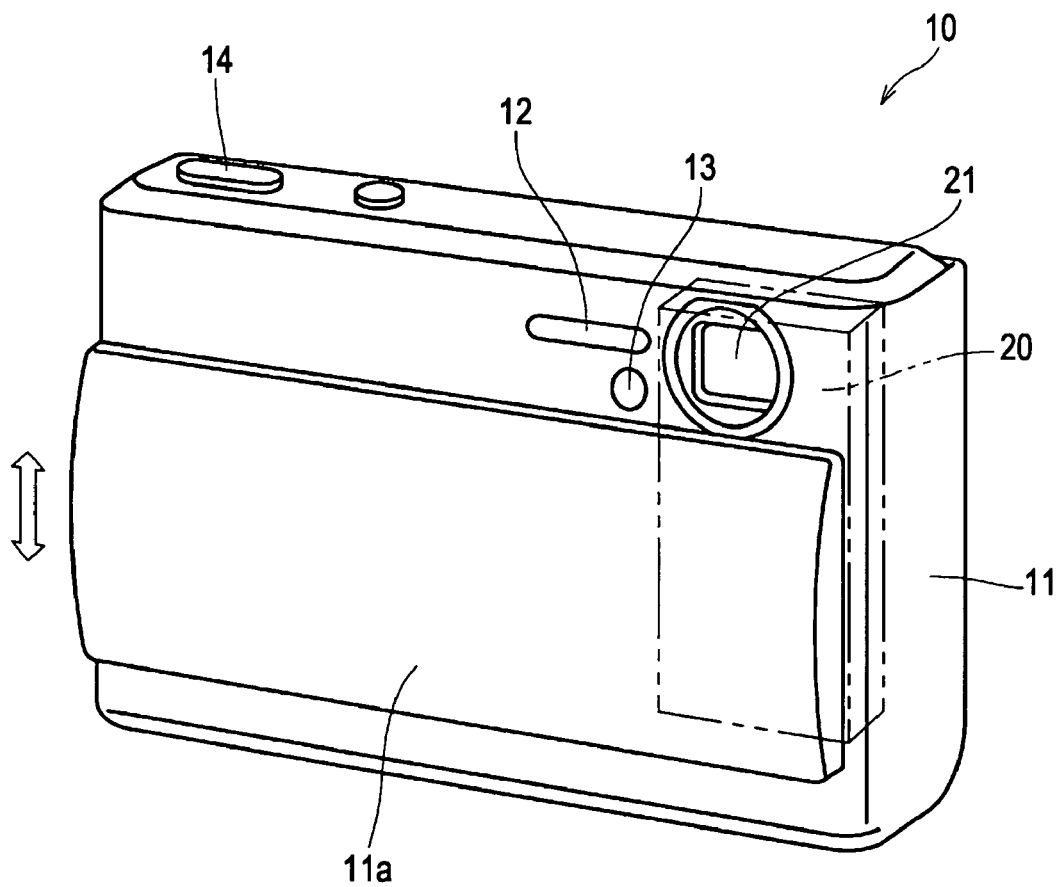
FIG. 1 is a perspective view of the front side of a digital still camera serving as an image pickup device according to an embodiment (a first embodiment) of the present invention.

FIG. 1 is a perspective view of the front side of the digital still camera 10 serving as an image pickup device according to an embodiment of the present invention.

Figure 2:
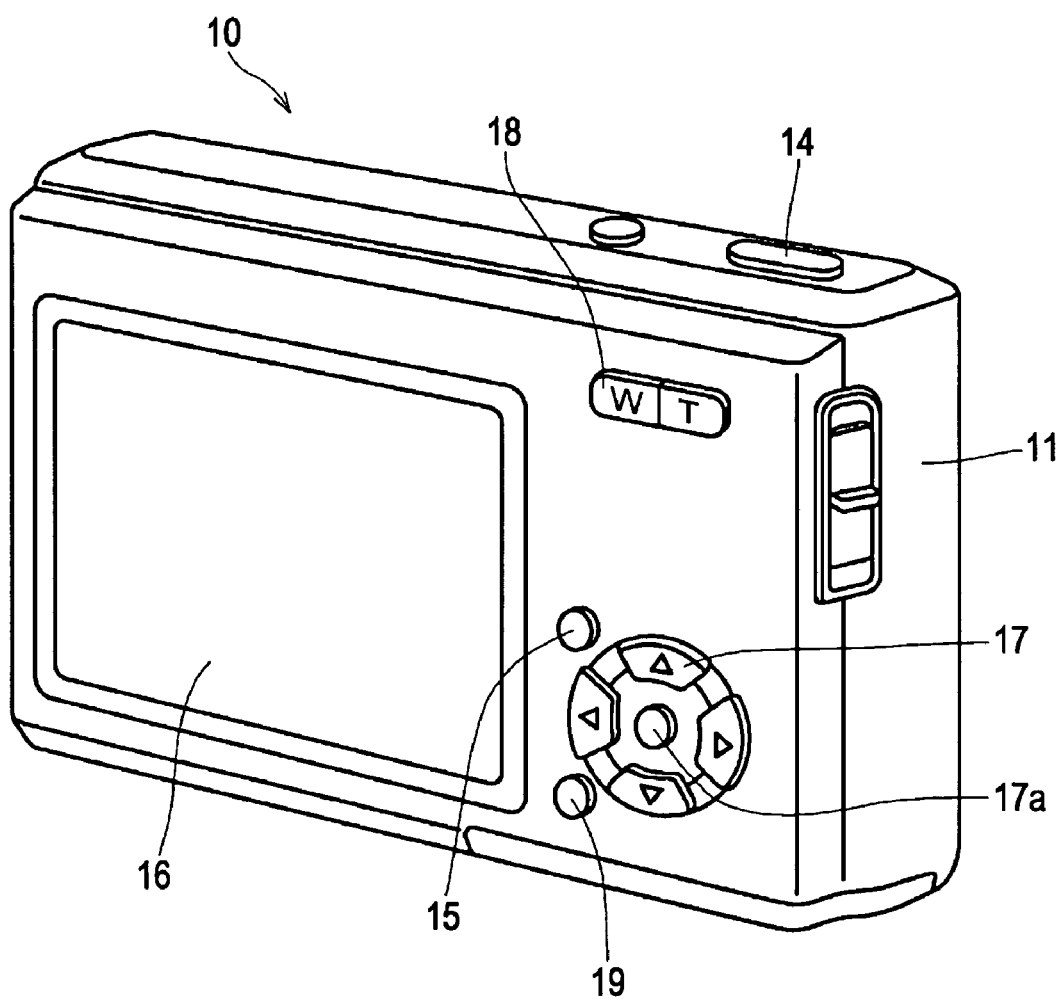
FIG. 2 is a perspective view of the rear side of the digital still camera serving as the image pickup device according to the embodiment (the first embodiment) of the present invention.

FIG. 2 is a perspective view of the rear side of the digital still camera 10 serving as the image pickup device according to the embodiment of the present invention.

As shown in FIG. 1, the digital still camera 10 has a rectangular parallelepiped body 11 constituting the exterior thereof. In FIG. 1, the lens barrel 20 shown by alternate long and two short dashed lines is built in the right side of the interior of the body 11. In addition, a lens 21, provided at the lens barrel 20, is positioned at the top portion of the front side of the body 11.

The left and right of the digital still camera 10 shown in FIGS. 1 and 2 refer to the left and right as viewed from the front side in FIG. 1.

A flash 12 and an auto focus (AF) auxiliary light generating section 13, which emit photographic auxiliary light, are provided on the immediate left side of the lens 21. Further, a shutter button 14 is provided on the left side of the upper surface of the body 11. Further, a cover 11a is provided at the front side of the body 11, and can slide as indicated by a double-headed arrow between a photography position and a protection position. At the photography position, the cover 11a is positioned at the lower portion at the front side of the body 11 and allows the lens 21, the flash 12, and the AF auxiliary light generating section 13 to be exposed. At the protection position, the cover 11a is positioned at the upper portion of the front side of the body 11 and covers them. Therefore, if the cover 11a is positioned at the photography position (that is, the position shown in FIG. 1) and the shutter button 14 is pressed, a photographic operation can be carried out.

As shown in FIG. 2, a menu button 15, a display 16, arrow keys 17, a zoom lever 18, and an exposure correction button 19 are provided on the rear side of the body 11. By operating the menu button 15, various setting menus (including, for example, a still image photographic mode, a moving image photographic mode, and a reproduction mode) can be displayed on the display 16 (such as a liquid crystal display unit). A setting is selected from the displayed menu using any arrow key 17, and the selected setting can be determined by a determination button 17a. In addition, in addition to the setting menus, the display 16 can display an image to be photographed or a reproduction of the photographed image. Further, by operating the zoom lever 18, a zooming operation (that is, a magnification change-over operation) can be performed. By operating the exposure correction button 19, exposure correction (such as backlight correction) can be performed by a one-touch operation.

Exemplary Cross Section of Lens Barrel

Figure 3:
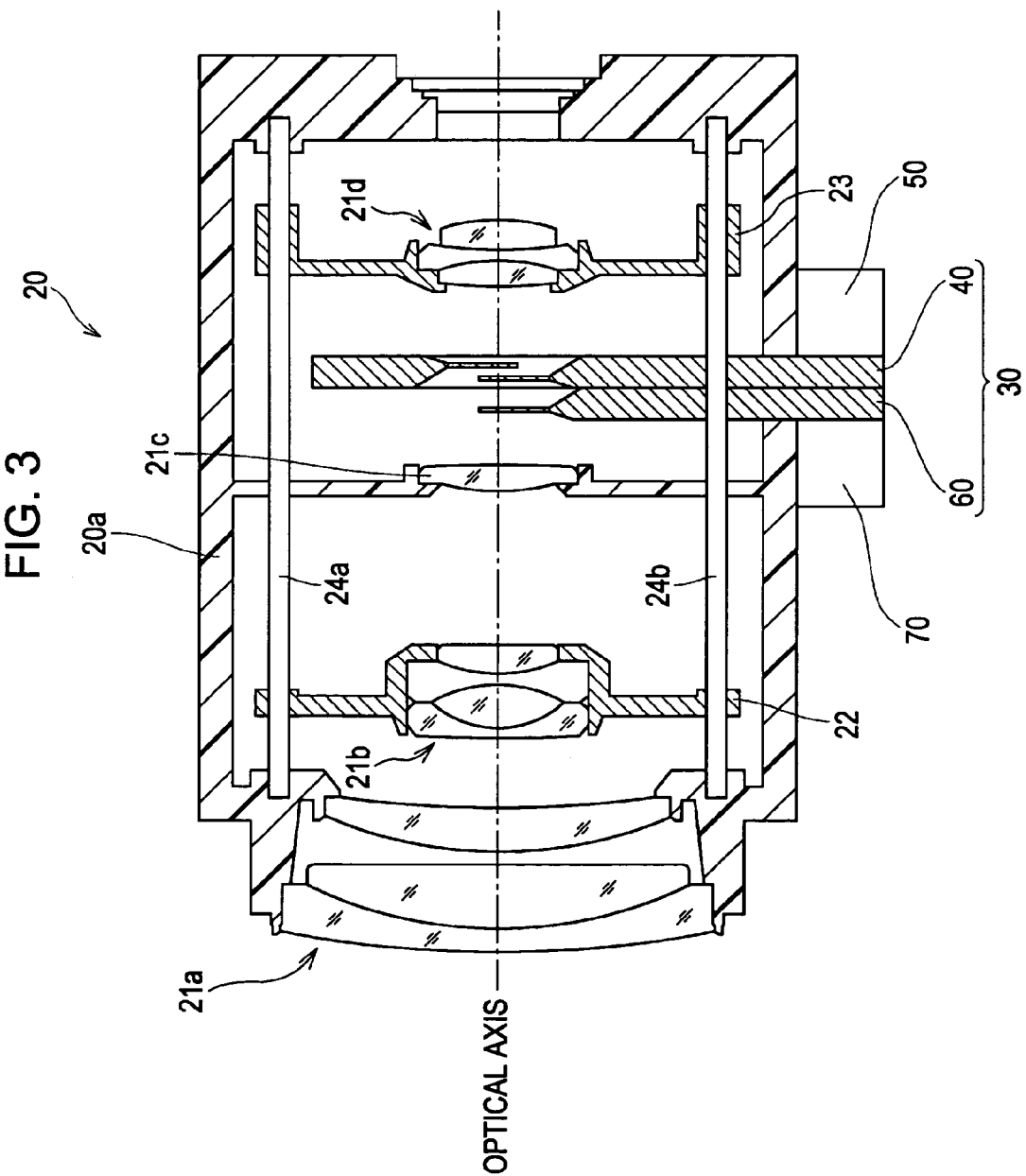
FIG. 3 is a sectional view of a lens barrel in an optical axis direction according to an embodiment of the present invention.

FIG. 3 is a sectional view of the lens barrel 20 in an optical axis direction serving as a lens barrel according to an embodiment of the present invention.

As shown in FIG. 3, the lens barrel 20 is a four-group inner-focus zoom lens including a front lens group 21a, a zoom lens group 21b, an intermediate lens 21c, and a focus lens group 21d, which are disposed with an optical axis being matched with a barrel body 20a. Therefore, by displacing the zoom lens group 21b in the optical axis direction by, for example, a stepping motor or a linear motor, a zooming operation (that is, a magnification change-over operation) can be performed. By displacing the focus lens group 21d in the optical axis direction, a focusing operation (that is, a focus control operation) can be carried out.

Figure 12:
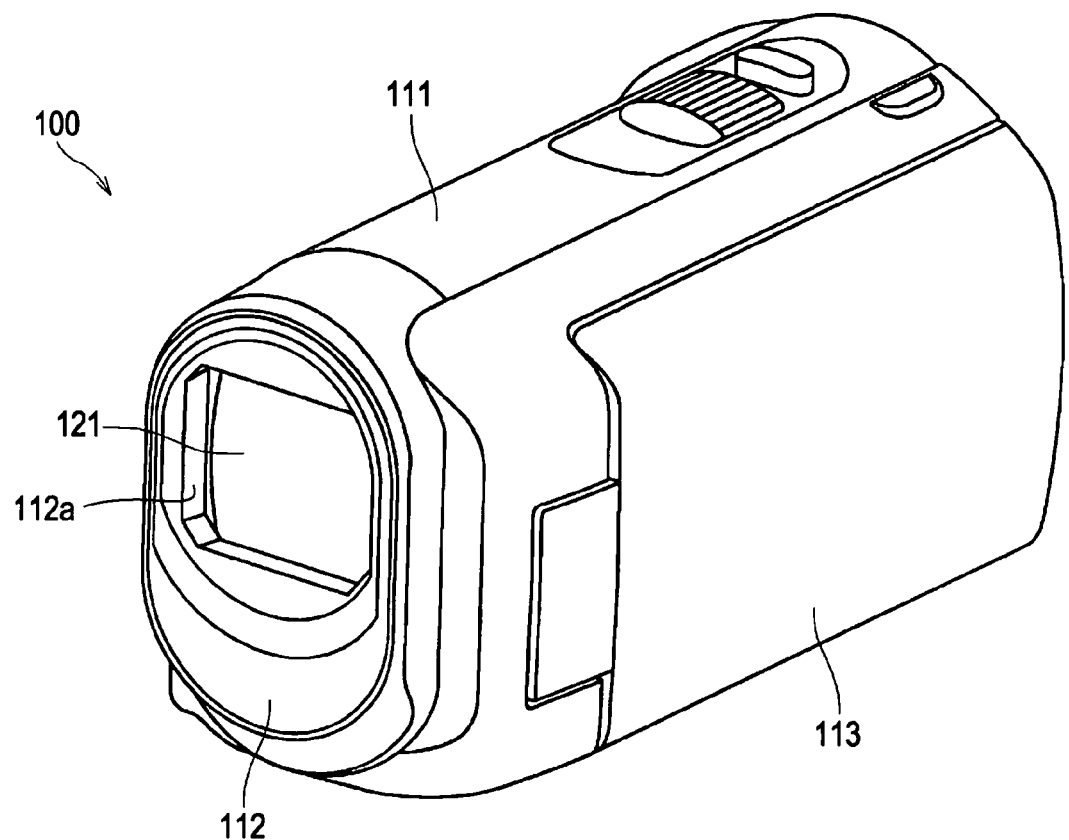
FIG. 12 is a perspective view of a digital video camera serving as an image pickup device according to an embodiment (a second embodiment) of the present invention.

The lens barrel 20 can be built in, not only the digital still camera 10 (refer to FIGS. 1 and 2), but also the digital video camera 100 (refer to FIG. 12).

Here, the barrel body 20a is formed of a black resin material (such as polycarbonate resin containing glass fiber) that is strong, that can be mass-produced, and that has light-shielding property. The front lens group 21a and the intermediate lens 21c are fixed to the barrel body 20a. In contrast, the zoom lens group 21b is held by a zoom lens holding frame 22 so as to be slidable in the optical axis direction between a guide shaft 24a and a guide shaft 24b, which are secured in the interior of the barrel body 20a so as to be parallel to the optical axis. In addition, the focus lens group 21d is held by a focus lens holding frame 23 so as to be slidable in the optical axis direction between the guide shafts 24a and 24b.

The light quantity adjusting device 30 is provided at the lens barrel 20, and is disposed between the intermediate lens 21c and the focus lens group 21d. The light quantity adjusting device 30 includes a diaphragm opening/closing device 40, a diaphragm moving device 50 (corresponding to a diaphragm driving unit according to an embodiment of the present invention), a neutral density (ND) filter opening/closing device 60, and a ND filter driving device 70 (corresponding to a ND filter driving unit according to an embodiment of the present invention). Accordingly, by opening/closing the diaphragm opening/closing device 40 by the diaphragm driving device 50, the amount of opening of a diaphragm opening can be increased or decreased. By opening/closing the ND filter opening/closing device 60 by the ND filter driving device 70, the quantity of light passing through the diaphragm opening can be increased or decreased using a ND filter (corresponding to a neutral density filter according to an embodiment of the present invention).

Exemplary Structure of Image Pickup Device

Figure 4:
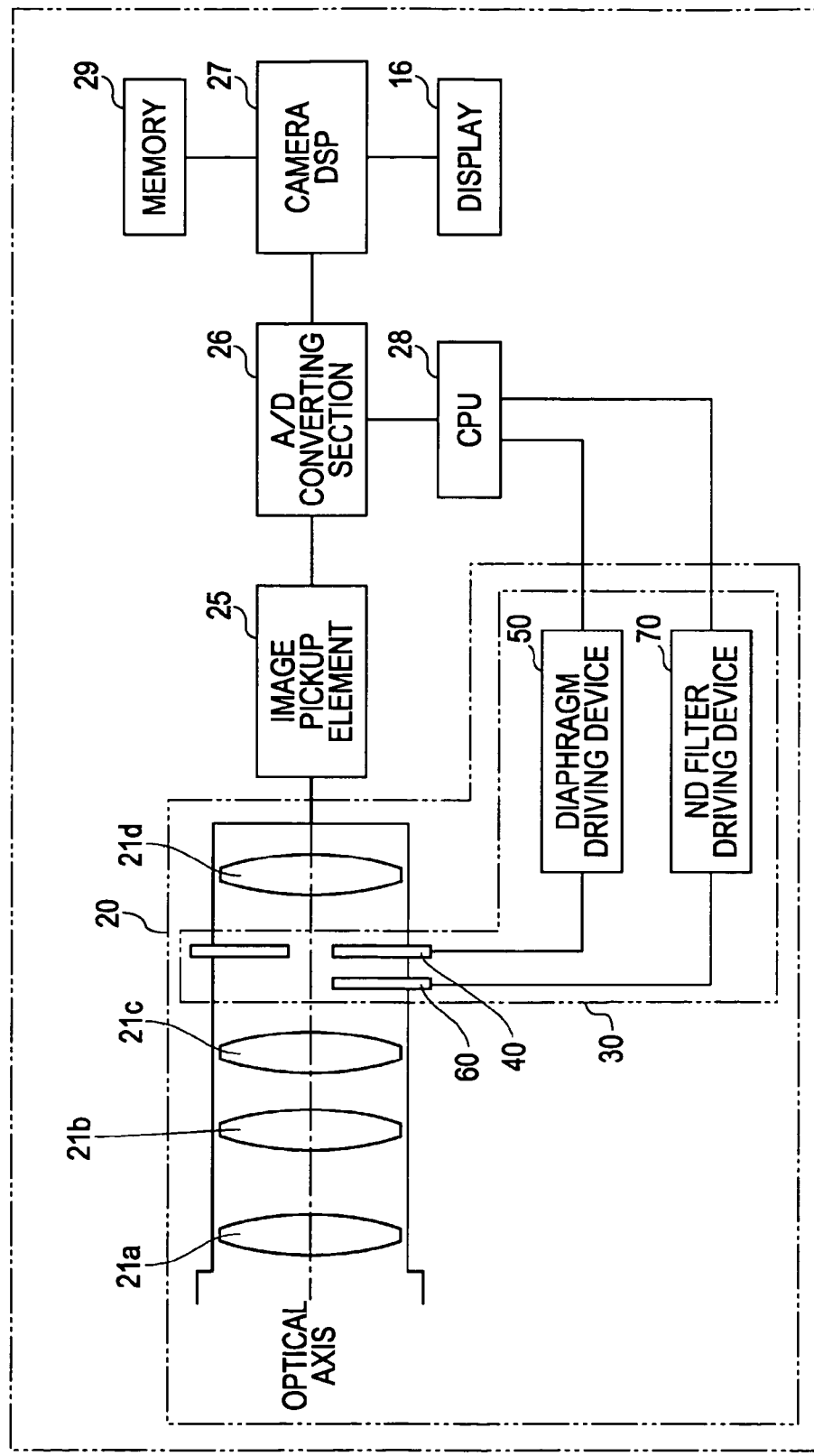
FIG. 4 is a block diagram of the structure of the digital still camera serving as the image pickup device according to the embodiment (the first embodiment) of the present invention.

FIG. 4 is a block diagram of the structure of the digital still camera 10 serving as the image pickup device according to the embodiment of the present invention.

As shown in FIG. 4, the lens barrel 20 is built in the digital still camera 10. The light quantity adjusting device 30 is built in the lens barrel 20. The digital still camera 10 includes an image pickup element 25, an analog/digital (A/D) converting section 26, a camera digital signal processor (DSP) 27, a central processing unit (CPU) 28, a memory 29, and the display 16.

Here, in the lens barrel 20, the front lens group 21a, the zoom lens group 21b, the intermediate lens 21c, and the focus lens group 21d are disposed along the optical axis. In addition, the diaphragm opening/closing device 40 constituting a portion of the light quantity adjusting device 30 is disposed between the intermediate lens 21c and the focus lens group 21d. The diaphragm opening/closing device 40 can increase or decrease the amount of opening of the diaphragm opening by being driven by the diaphragm driving device 50. For example, if a bright object is to be photographed, in order to reduce the quantity of light incident upon the image pickup element 25, the amount of opening of the diaphragm opening is reduced to reduce the quantity of light passing through the diaphragm opening.

The ND filter opening/closing device 60 constituting a portion of the light quantity adjusting device 30 is also disposed between the intermediate lens 21c and the focus lens group 21d. In addition, in the embodiment, the ND filter opening/closing device 60 is disposed at an incident-light side, which is the front side, of the diaphragm opening/closing device 40, and is driven by the ND filter driving device 70. Therefore, by covering the front side of the diaphragm opening with a ND filter 64 (not shown), it is possible to reduce the quantity of incident light passing through the diaphragm opening.

In the lens barrel 20 in which such a light quantity adjusting device 30 is installed, the incident light (object image) whose light quantity is adjusted by the ND filter opening/closing device 60 and the diaphragm opening/closing device 40 is focused on the image pickup element 25. The image pickup element 25 is, for example, a charge coupled device (CCD)

image sensor or a complementary metal oxide semiconductor (CMOS) sensor. The light is subjected to photoelectric conversion by the image pickup element 25, and an analog signal (which is an output thereof) is converted into a digital signal by the A/D converting section 26. The digital signal is subjected to a processing operation (such as gamma correction, color separation, or a color-difference matrix processing operation) by the camera DSP 27 to generate a standard television signal to which a synchronization signal is added. Further, the camera DSP 27 transmits exposure control luminance data to the CPU 28. The image processed by the camera DSP 27 is stored in the memory 29 if necessary, and is displayed on the display 16.

The CPU 28 performs an exposure control calculation on the basis of the luminance data transmitted from the camera DSP 27. If the calculation result is not proper, the diaphragm driving device 50 and the ND filter driving device 70 are controlled so that a proper exposure value is provided. For example, if the exposure is controlled so that the exposure value is reduced from a state in which the diaphragm opening/closing device 40 and the ND filter opening/closing device 60 are open, the diaphragm driving device 50 is controlled and the diaphragm opening/closing device 40 is driven, to reduce the amount of opening of the diaphragm opening.

Here, if the amount of opening of the diaphragm opening is reduced, a diffraction phenomenon occurs, that is, what is called a small aperture state occurs. Therefore, the diaphragm opening is such that its amount of opening does not correspond to the small aperture state. If the quantity of light passing through the diaphragm opening is to be further reduced, a command from the CPU 28 causes the ND filter driving device 70 to be controlled, and the ND filter opening/closing device 60 to be driven, so that the diaphragm opening is covered by the ND filter.

If, when the diaphragm opening is covered by the ND filter, the type of photographic operation is changed from a photographic operation of a bright object to a photographic operation of, for example, an object in a shadow, the exposure value becomes insufficient. In this case, the CPU 28 controls the ND filter driving device 70 and drives the ND filter opening/closing device 60, to cause the ND filter to withdraw from the diaphragm opening. If the exposure value is still insufficient, the CPU 28 controls the diaphragm driving device and drives the diaphragm opening/closing device 40, to increase the amount of opening of the diaphragm opening.

The CPU 28 also adjusts the shutter speed in accordance with the exposure value.

Exemplary Structure of Light Quantity Adjusting Device

Figure 5:
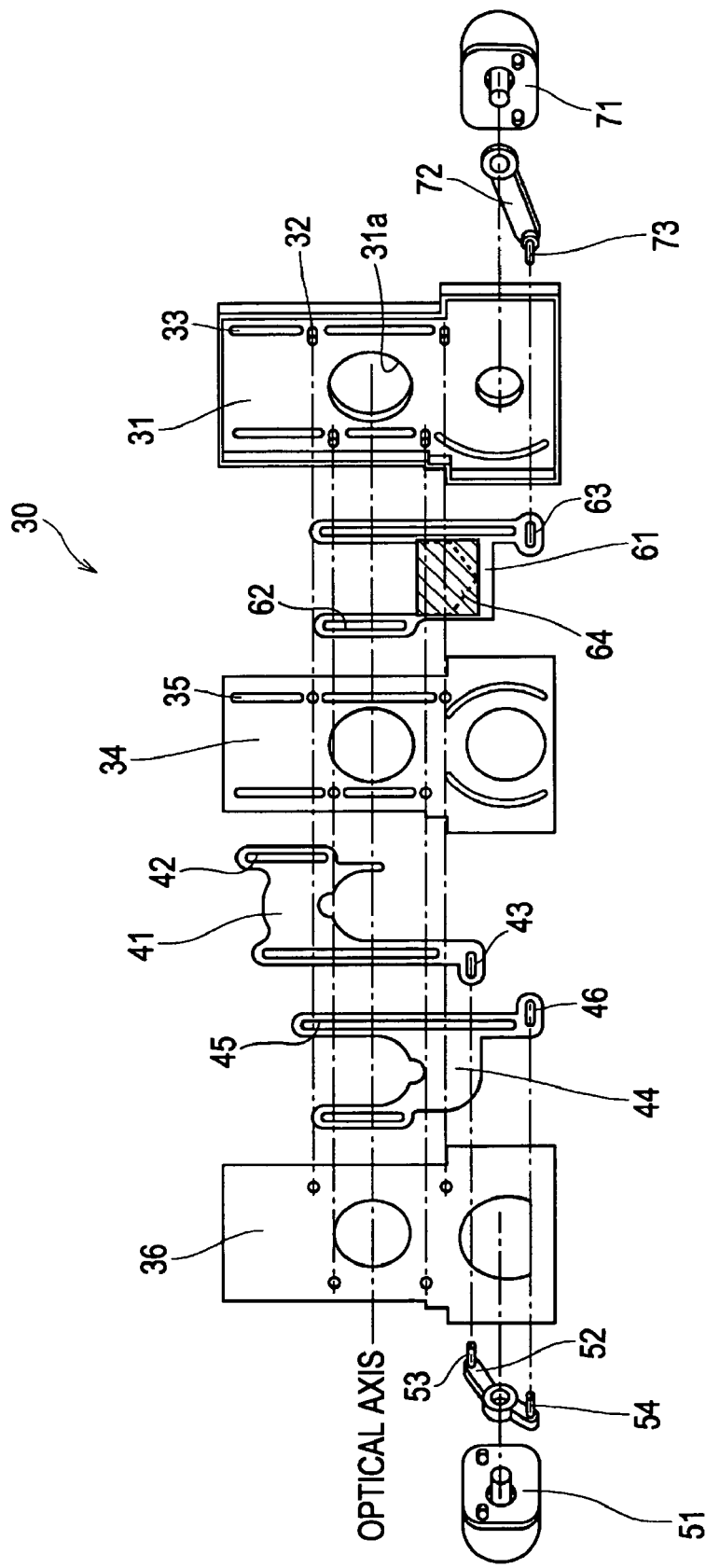
FIG. 5 is an exploded perspective view of the structure of a light quantity adjusting device according to an embodiment of the present invention.

FIG. 5 is an exploded perspective view of the structure of the light quantity adjusting device 30 serving as a light quantity adjusting device according to an embodiment of the present invention.

As shown in FIG. 5, the light quantity adjusting device 30 includes a plate 31, a partition plate 34, and a holding plate 36.

The light quantity adjusting device 30 also includes an upper diaphragm blade 41 and a lower diaphragm blade 44 constituting the diaphragm opening/closing device 40 (see FIG. 3). In addition, the light quantity adjusting device 30 includes a diaphragm driving motor 51 (corresponding to a diaphragm blade driving unit according to an embodiment of the present invention) and a diaphragm driving motor 52, which constitute the diaphragm driving device 50 (see FIG. 3).

Although, in the embodiment, the diaphragm driving motor 51 is a stepping motor, it may also be, for example, a linear motor.

The light quantity adjusting device 30 further includes a ND blade 61 constituting the ND filter opening/closing device 60 (see FIG. 3). The ND blade 61 holds the ND filter 64 (corresponding to the neutral density filter according to an embodiment of the present invention) having a constant transmittance. The light quantity adjusting device 30 further includes a ND driving motor 71 (corresponding to a neutral density filter driving unit according to an embodiment of the present invention) and a ND driving arm 72, which constitute the ND filter driving device 70 (see FIG. 3).

The ND filter itself may form the shape of the ND blade. Although, in the embodiment, the ND driving motor 71 is a stepping motor, it may also be, for example, a linear motor.

Here, a circular opening portion 31a for receiving incident light is formed in the plate 31. The plate 31 is disposed perpendicularly to an optical axis of the incident light from the opening portion 31a. In the plate 31, four guide pins 32 are integrally formed, and protruding rails 33 are provided in two rows. Two guide holes 62 that receive the guide pins 32 are formed in the ND blade 61. Therefore, the ND blade 61 is mounted along a surface of the plate 31 by inserting the guide pins 32 into the guide holes 62. Further, the ND blade 61 can reciprocate perpendicularly to the optical axis of the incident light through the elongated guide holes 62 while friction force is reduced along the rails 33.

The partition plate 34 is provided for preventing the ND blade 61 from contacting the upper diaphragm blade 41 and the lower diaphragm blade 44. For example, the partition plate 34 is formed of stainless plate, and has two rows of rails 35 on both the front and back surfaces thereof. The upper diaphragm blade 41 has guide holes 42 for receiving the guide pins 32 through the partition plate 34. The lower diaphragm blade 44 also has similar guide holes 45. Therefore, the upper diaphragm blade 41 and the lower diaphragm blade 44 are individually mounted along the surface of the plate 31 through the partition plate 34 by inserting the guide pins 32 into the guide holes 42 and the guide holes 45, respectively. Further, the upper diaphragm blade 41 and the lower diaphragm blade 44 can reciprocate perpendicularly to the optical axis of the incident light through the elongated guide holes 42 and 45 while friction force is reduced along the rails 35.

Further, a surface of each of the upper diaphragm blade 41 and the lower diaphragm blade 44 is covered by the holding plate 36. For example, the holding plate 36 is formed of a stainless plate and has two rows of rails (not shown) on a surface thereof opposing the upper diaphragm blade 41 and the lower diaphragm blade 44.

The holding plate 36 and the partition plate 34 are secured to the plate 31 by, for example, a snap-fit operation. The diaphragm driving motor 51 is secured to the holding plate 36 by, for example, screw fastening or bonding. The ND driving motor 71 is secured to the plate 31 by, for example, screw fastening or bonding.

Further, a ND driving pin 73 is integrated to an end of the ND driving arm 72, and is fitted into a cam hole 63 of the ND blade 61 through the plate 31. An upper diaphragm driving pin 53 and a lower diaphragm driving pin 54 are integrated to respective ends of the diaphragm driving arm 52, and are fitted into a cam hole 43 of the upper diaphragm blade 41 and a cam hole 46 of the lower diaphragm blade 44, respectively, through the holding plate 36.

Here, the cam hole 43 of the upper diaphragm blade 41 and the cam hole 46 of the lower diaphragm blade 44 convert forward/reverse rotation of the diaphragm driving arm 52 into reciprocating motion of the upper diaphragm blade 41 and the lower diaphragm blade 44. Therefore, if the diaphragm driving arm 52 is rotated forwardly/reversely by the diaphragm driving motor 51, driving force of the diaphragm driving motor 51 is transmitted by the cam hole 43 and the cam hole 46, so that the upper diaphragm blade 41 and the lower diaphragm blade 44 reciprocate in opposite directions to each other. In addition, the upper diaphragm blade 41 and the lower diaphragm blade 44 open/close the opening portion 31a while being guided by the guide pins 32.

Similarly, the cam hole 63 of the ND blade 61 converts forward/reverse rotation of the ND driving arm 72 into reciprocating motion of the ND blade 61. Therefore, if the ND driving arm 72 is rotated forwardly/reversely by the ND driving motor 71, driving force of the ND driving motor 71 is transmitted by the cam hole 63, so that the ND blade 61 reciprocates. In addition, the ND blade 61 opens/closes the opening portion 31a while being guided by the guide pins 32.

If the ND driving motor 71 is not used, and a diaphragm driving arm, provided at the ND driving pin, is used, the upper diaphragm blade 41, the lower diaphragm blade 44, and the ND blade 61 can be made to reciprocate by only the diaphragm driving motor 51.

The external shape of the upper diaphragm blade 41 is formed so as to avoid a path of movement of the lower diaphragm driving pin 54 disposed opposite to the upper diaphragm driving pin 53 that is fitted to the cam hole 43 of the upper diaphragm blade 41. The external shape of the lower diaphragm blade 44 is also similarly formed. Therefore, the upper diaphragm blade 41 and the lower diaphragm blade 44 can reciprocate without interfering with each other. Not only are the upper diaphragm blade 41, the lower diaphragm blade 44, and the ND blade 61 assembled by dropping them towards the surface of the plate 31, but also they can be made thin. Therefore, the cost and size of the light quantity adjusting device 30 are reduced.

Further, a lower-limit position of the reciprocating motion of the lower diaphragm blade 44 and a lower-limit position of the reciprocating motion of the ND blade 61 overlap each other in an up-down direction at the surface of the plate 31. In other words, the lower diaphragm blade 44 and the ND blade 61 are provided so as to overlap each other at their low-limit positions of the reciprocating motion. Therefore, space for disposing the lower diaphragm blade 44 and the ND blade 61 can be shared, so that the light quantity adjusting device 30 is reduced in size.

Figure 6:
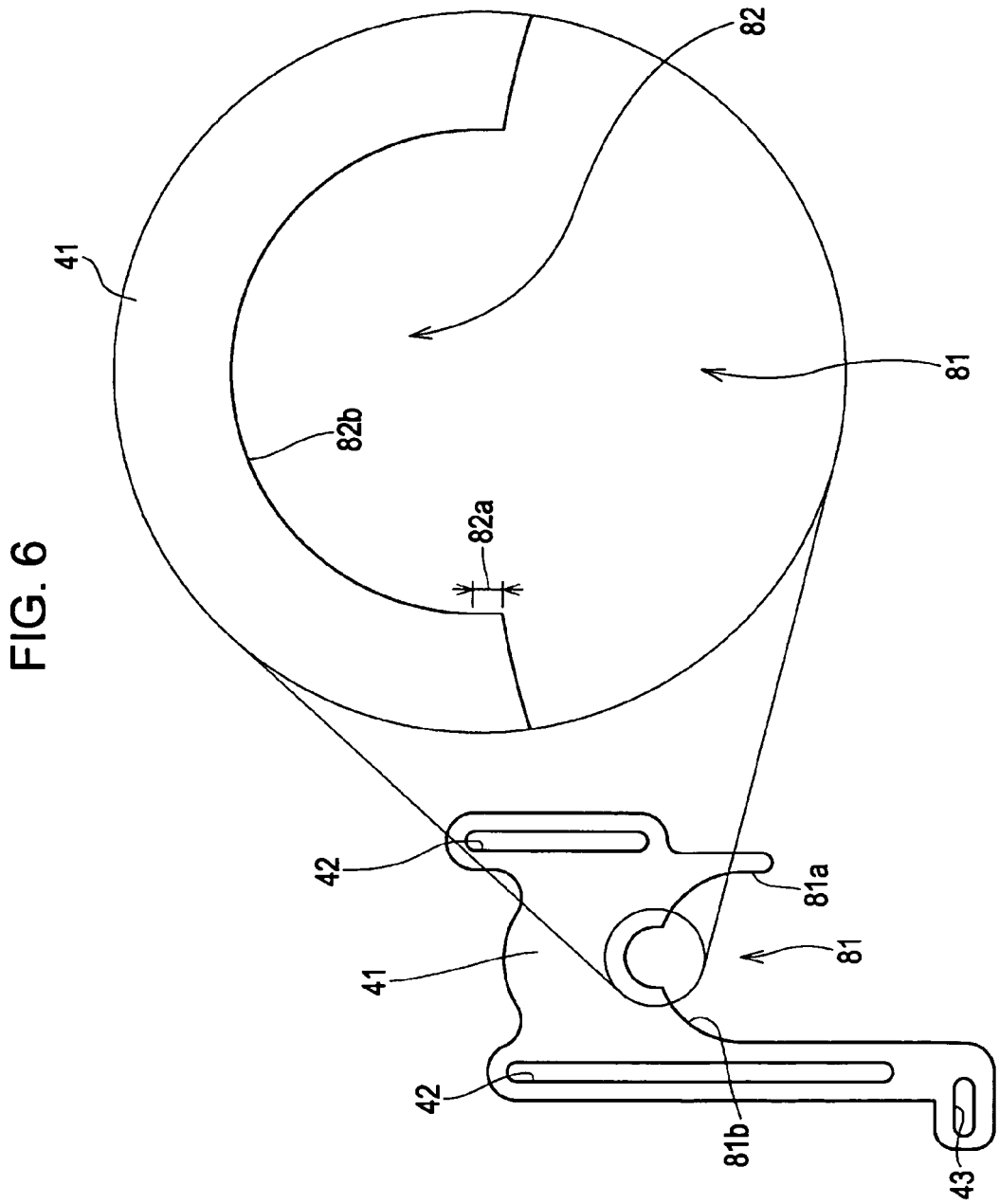
FIG. 6 is a front view of an upper diaphragm blade of the light quantity adjusting device according to the embodiment of the present invention.

FIG. 6 is a front view of the upper diaphragm blade 41 of the light quantity adjusting device 30 serving as the light quantity adjusting device according to the embodiment of the present invention.

Figure 7:
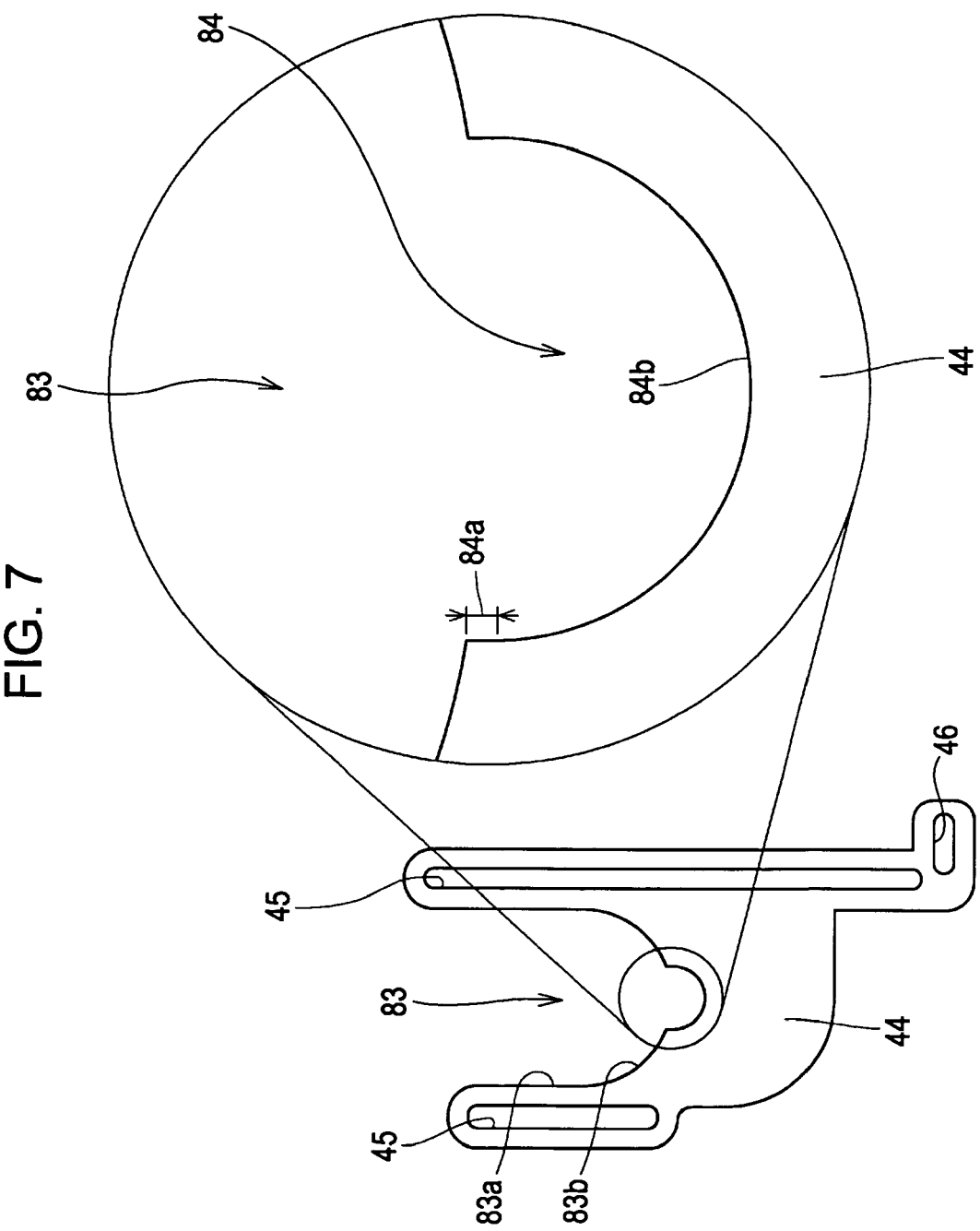
FIG. 7 is a front view of a lower diaphragm blade of the light quantity adjusting device according to the embodiment of the present invention.

FIG. 7 is a front view of the lower diaphragm blade 44 of the light quantity adjusting device 30 serving as the light quantity adjusting device according to the embodiment of the present invention.

As shown in FIG. 6, the upper diaphragm blade 41 has the pair of left and right guide holes 42 and the cam hole 43 to which the upper diaphragm driving pin 53 (see FIG. 5) is fitted, so as to allow the upper diaphragm blade 41 to reciprocate along the surface of the plate 31 (see FIG. 5).

A semicircular upper main opening 81 that opens upward and that has a size corresponding to that of the upper half of the opening portion 31a (see FIG. 5) is formed between the guide holes 42. A semicircular upper sub opening 82 that opens upward and whose size is smaller than that of the upper main opening 81 is formed at the top portion of the upper main opening 81. The upper main opening 81 has linear portions 81a, provided at respective ends thereof, and an arch-shaped portion 81b, provided between the linear portions 81a. The upper sub opening 82 has linear portions 82a, provided at respective ends thereof, and an arch-shaped portion 82b, provided between the linear portions 82a.

As shown in FIG. 7, the lower diaphragm blade 44 has the pair of left and right guide holes 45 and the cam hole 46 to which the lower diaphragm driving pin 54 (see FIG. 5) is fitted, so as to allow the lower diaphragm blade 44 to reciprocate along the surface of the plate 31 (see FIG. 5).

A semicircular lower main opening 83 that opens downward and that has a size corresponding to that of the lower half of the opening portion 31a (see FIG. 5) is formed between the guide holes 45. A semicircular lower sub opening 84 that opens downward and whose size is the same as that of the upper sub opening 82 (see FIG. 6) is formed at the bottom portion of the lower main opening 83. The lower main opening 83 has linear portions 83a, provided at respective ends thereof, and an arch-shaped portion 83b, provided between the linear portions 83a. The lower sub opening 84 has linear portions 84a, provided at respective ends thereof, and an arch-shaped portion 84b, provided between the linear portions 84a.

Exemplary Operation of Light Quantity Adjusting Device

Figure 8:
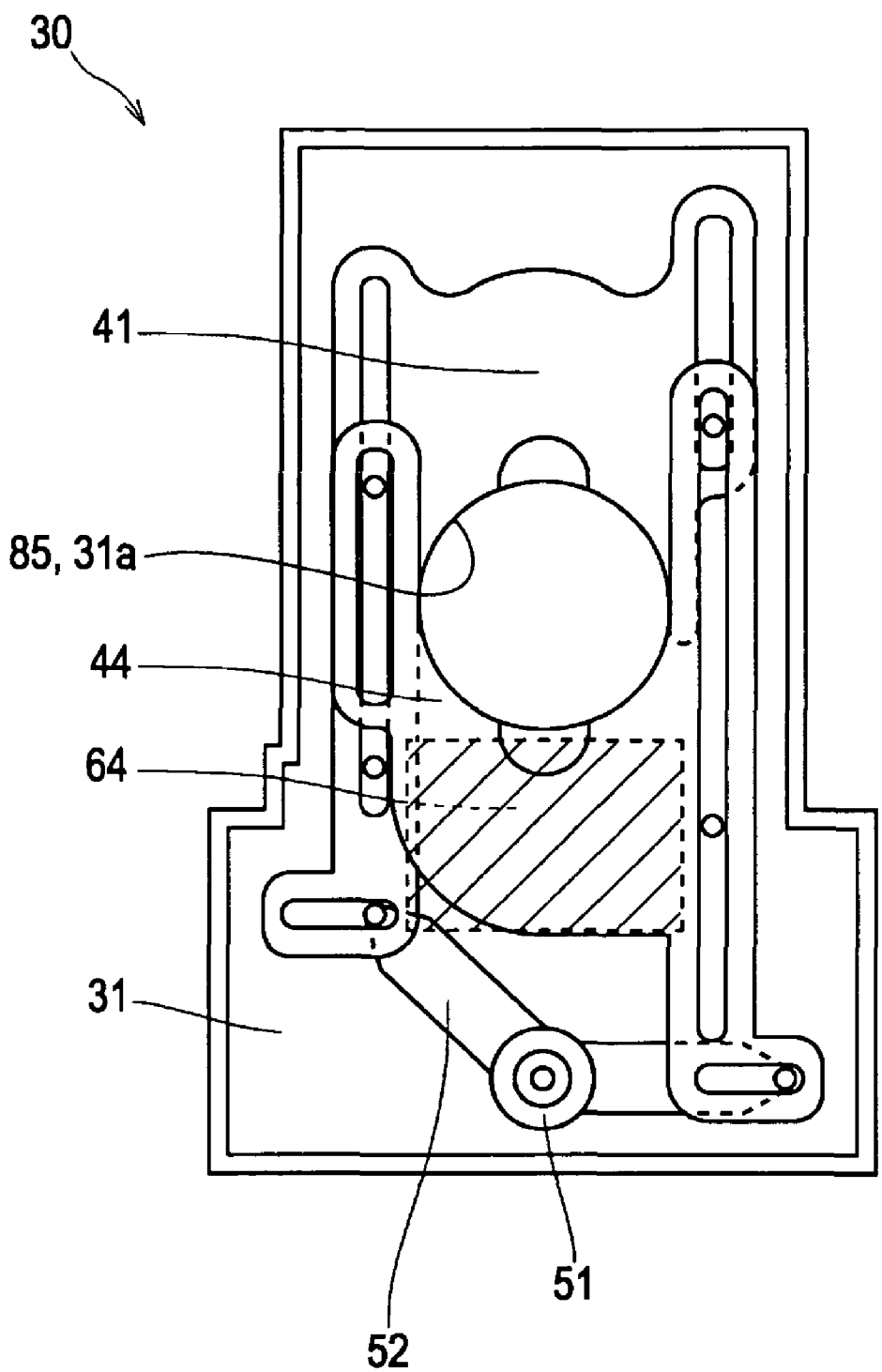
FIG. 8 is a front view of a first stage of a diaphragm operation in the light quantity adjusting device according to the embodiment of the present invention.

FIG. 8 is a front view of a first stage of a diaphragm operation in the light quantity adjusting device 30 serving as the light quantity adjusting device according to the embodiment of the present invention.

Figure 9:
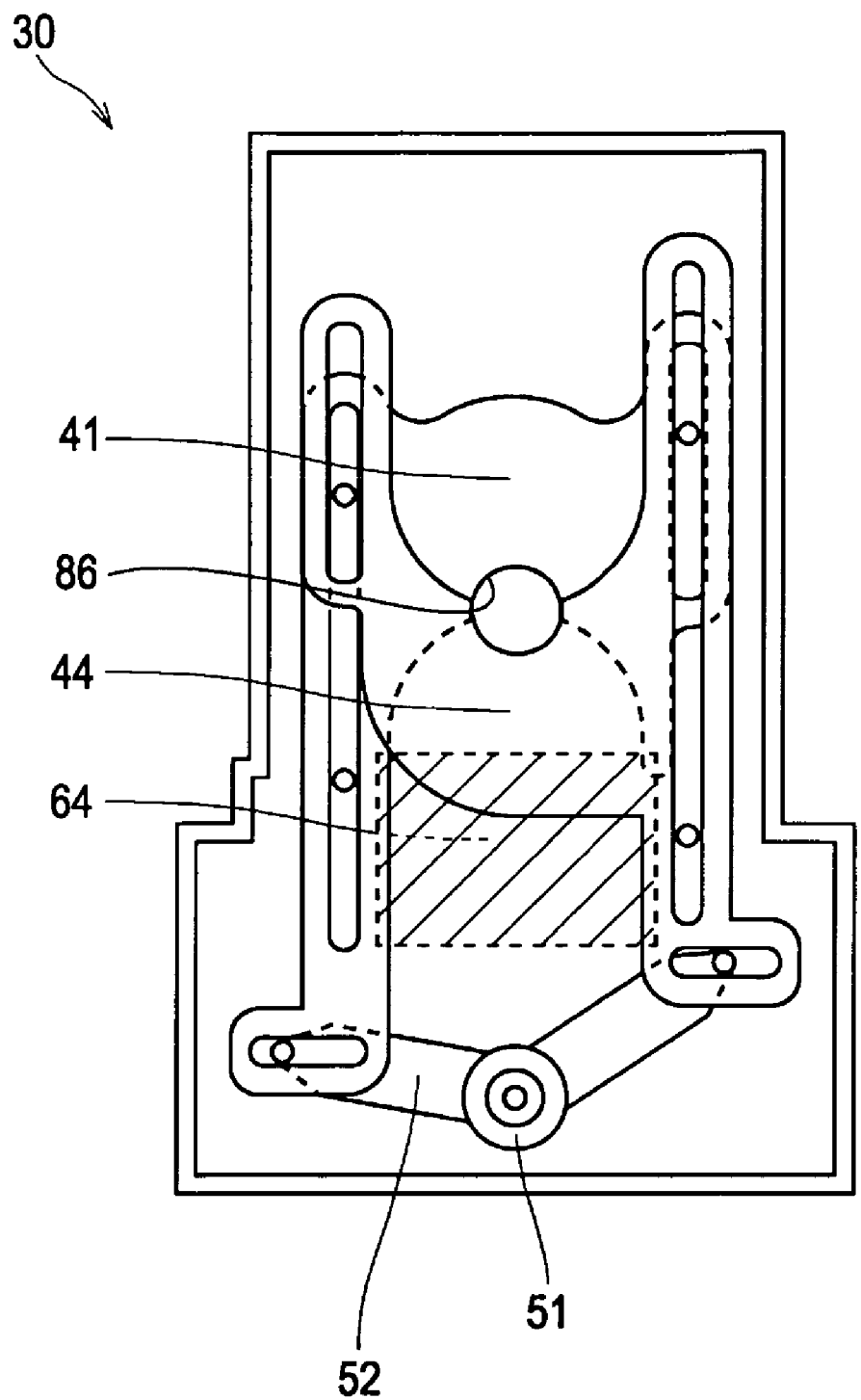
FIG. 9 is a front view of a second stage of the diaphragm operation in the light quantity adjusting device according to the embodiment of the present invention.

FIG. 9 is a front view of a second stage of the diaphragm operation in the light quantity adjusting device 30 serving as the light quantity adjusting device according to the embodiment of the present invention.

Figure 10:
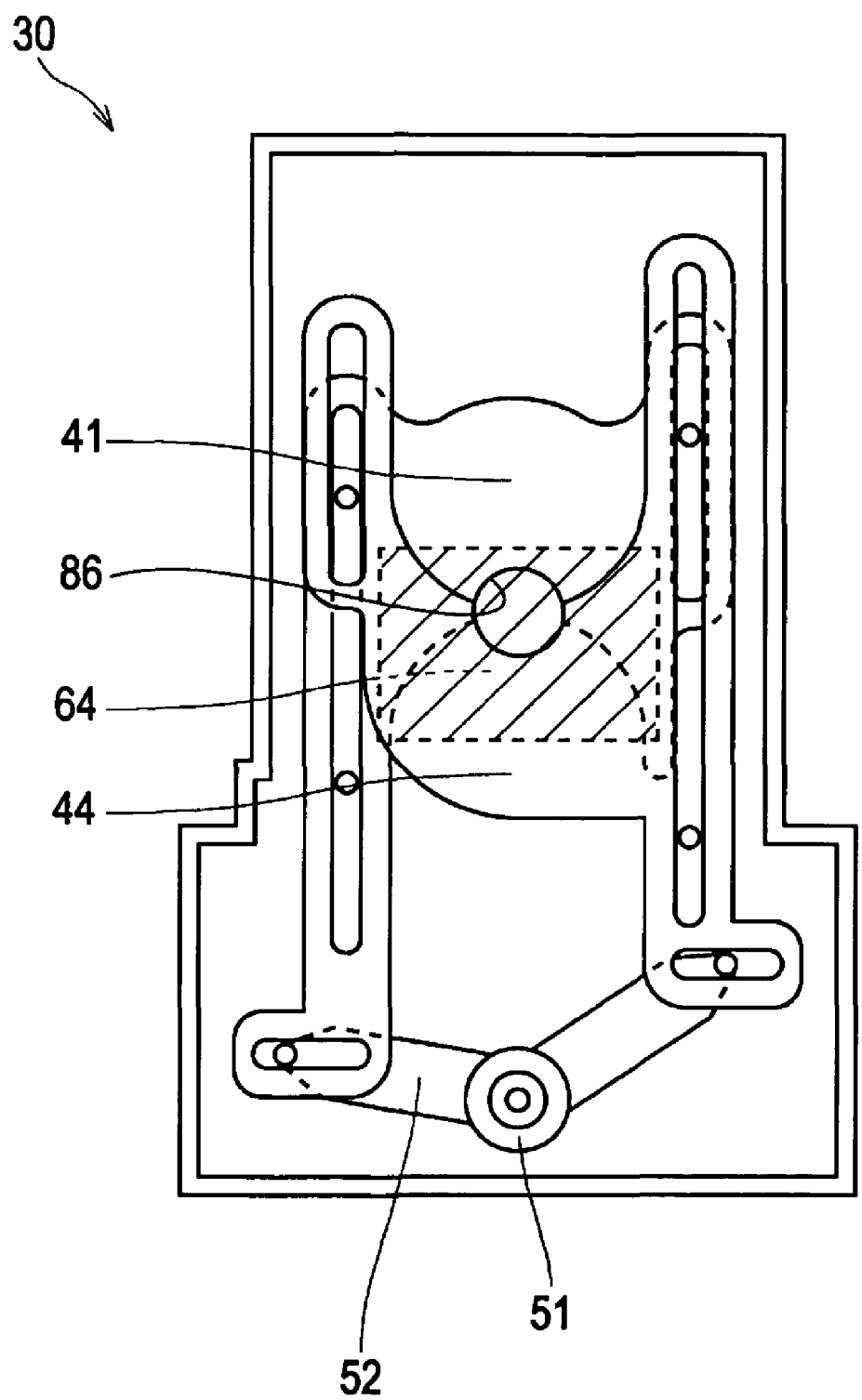
FIG. 10 is a front view of a third stage of the diaphragm operation in the light quantity adjusting device according to the embodiment of the present invention.

FIG. 10 is a front view of a third stage of the diaphragm operation in the light quantity adjusting device 30 serving as the light quantity adjusting device according to the embodiment of the present invention.

Figure 11:
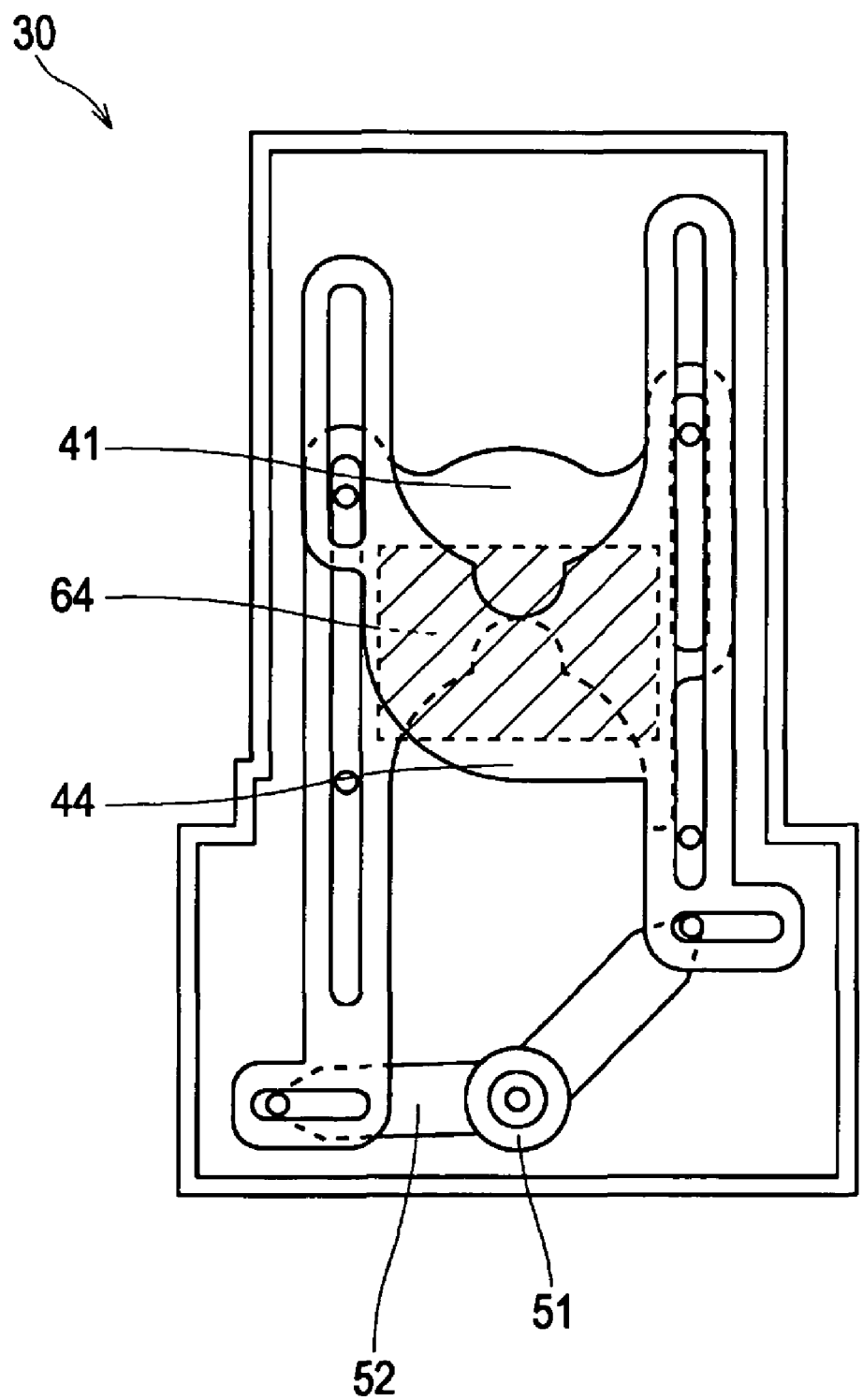
FIG. 11 is a front view of a fourth stage of the diaphragm operation in the light quantity adjusting device according to the embodiment of the present invention.

FIG. 11 is a front view of a fourth stage of the diaphragm operation in the light quantity adjusting device 30 serving as the light quantity adjusting device according to the embodiment of the present invention.

In the first stage of the diaphragm operation shown in FIG. 8, the diaphragm driving arm 52 is rotated clockwise by the diaphragm driving motor 51. In addition, the upper diaphragm blade 41 is moved upward with respect to the plate 31, and the lower diaphragm blade 44 is moved downward with respect to the plate 31. Therefore, a diaphragm opening formed at a surface side of opening portion 31a by the upper diaphragm blade 41 and the lower diaphragm blade 44 becomes a circular main diaphragm opening 85 (whose center corresponds to an optical axis) by the upper main opening 81 (see FIG. 6) and the lower main opening 83 (see FIG. 7).

Here, the upper main opening 81 (see FIG. 6) has a size corresponding to that of the upper half of the opening portion 31a. The lower main opening 83 (see FIG. 7) has a size corresponding to that of the lower half of the opening portion 31a. Therefore, the main diaphragm opening 85 has a circular shape corresponding to an opening having a size that is substantially the same as that of the opening portion 31a. The ND filter 64 is positioned so as to be separated from the opening portion 31a. Therefore, the first stage of the diaphragm operation corresponds to a fully open state of the diaphragm in which the opening portion 31a is not covered by the ND filter 64.

The respective ends of the upper main opening 81 correspond to the linear portions 81a (see FIG. 6). The respective ends of the lower main opening 83 also correspond to the linear portions (see FIG. 7). Therefore, the main diaphragm opening 85 is not round, but is slightly elliptical. However, the linear portions 81a and the linear portions 83a allow hysteresis to occur in exposure control, so that a relative reciprocation error can be allowed.

Next, in the second stage of the diaphragm operation shown in FIG. 9, the diaphragm driving arm 52 is rotated counterclockwise by the diaphragm driving motor 51. Switching to a state in which a circular sub diaphragm opening 86 (having an optical axis as center) is formed by the upper sub opening 82 (see FIG. 6) and the lower sub opening 84 (see FIG. 7) is carried out. The sub diaphragm opening 86 is smaller than the main diaphragm opening 85 (see FIG. 8), so that the amount of opening of the opening portion 31a is reduced.

The size of the sub diaphragm opening 86 is set so that a resolution property becomes as high as possible in a range in which the small aperture state does not occur (that is, deterioration in diffraction does not occur).

Therefore, the light quantity adjusting device 30 according to the embodiment makes it possible to change from a fully open state of the opening portion 31a achieved by the main diaphragm opening 85 (that is, the first stage of the diaphragm operation) as shown in FIG. 8 to a state in which the opening portion 31a is narrowed by the sub diaphragm opening 86 (that is, the second stage of the diaphragm operation) as shown in FIG. 9. In addition, when the first stage is changed to the second stage, gain of an amplifier or the shutter speed of an electronic shutter is changed to cause it to follow a change in the brightness (exposure value) of an object. Therefore, it is possible to perform continuous exposure control while the diaphragm opening is kept in a circular shape, so that a good circular out-of-focus image can be obtained. The opening portion 31a is not set in a fully closed state between the first and second stages. Therefore, by performing continuous exposure control, it is possible to use the opening portion 31a not only for photographing a still image but also for photographing a moving image.

Next, in a third stage of the diaphragm operation shown in FIG. 10, in order to further change exposure, the ND filter 64 is moved for switching to a state in which the sub diaphragm opening 86 is covered by the ND filter 64. More specifically, the ND driving motor 71 shown in FIG. 5 is rotated clockwise to raise the ND blade 61 by the ND driving arm 72. Therefore, it is possible to reduce the occurrence of diffraction deterioration caused by a small aperture. In addition, it is possible to prevent a reduction in image quality caused by reflection at an end surface or a diffraction phenomenon caused by a partial covering operation by the ND filter 64.

A rotational state of the ND driving motor 71 makes it possible to set the ND filter 64 in a partial covering state.

Here, it is desirable that, when photographing a moving image, the diaphragm operation of the third stage shown in FIG. 10 be performed as quickly as possible. When the sub diaphragm opening 86 is covered by the ND filter 64, the upper diaphragm blade 41 and the lower diaphragm blade 44 may be slightly moved. Here, by changing gain of an amplifier or the shutter speed of an electronic shutter, exposure changes resulting from the movements of the upper diaphragm blade 41 and the lower diaphragm blade 44 and the covering/uncovering of the ND filter 64 are canceled, as a result of which continuous exposure control is performed.

If the density of the ND filter 64 is a two-density type or a gradation type and the density for covering the sub diaphragm opening 86 is changed, it is possible to further change the exposure. The filter is not limited to the ND filter 64, so that it may also be a liquid crystal filter or other types of ND filters that can change transmittance.

In a fourth stage of the diaphragm operation shown in FIG. 11, the upper diaphragm blade 41 and the lower diaphragm blade 44 are further subjected to a narrowing operation. By this, as shown in FIG. 10, even after covering the sub diaphragm opening 86 by the ND filter 64, it is possible to reduce the quantity of light that is incident upon the image pickup element 25 (see FIG. 4). As shown in FIG. 11, by subjecting the upper diaphragm blade 41 and the lower diaphragm blade 44 to the narrowing operation so as to set them in the fully closed state, it is possible to use in common the shutter functions achieved by the upper diaphragm blade 41 and the lower diaphragm blade 44.

In recent years, if the image pickup element 25 (see FIG. 4) is a CMOS image sensor, a read-out speed is particularly high. Therefore, it is no longer necessary to use in common the mechanical shutter functions achieved by the upper diaphragm blade 41 and the lower diaphragm blade 44. Therefore, in this case, it is possible to omit the fourth stage of the diaphragm operation shown in FIG. 11.

Accordingly, in the light quantity adjusting device 30 according to the embodiment, the driving motor 51 and the ND driving motor 71 shown in FIG. 5 cause the upper diaphragm blade 41 the lower diaphragm blade 44, and the ND filter 64 (ND blade 61) to reciprocate. Then, the diaphragm operations from the first stage shown in FIG. 8 to the fourth stage shown in FIG. 11 are carried out.

In order to reduce the pressure angle of the cam hole 43, the cam hole 46, and the cam hole 63 in each stage, the rotational angles of the ND driving arm 72 and the diaphragm driving arm 52 allocated to each stage are increased.

By carrying out the diaphragm operations from the first stage (shown in FIG. 8) to the fourth stage (shown in FIG. 11), a smooth exposure control can be carried out while preventing a deterioration in diffraction caused by a small aperture. In addition, not only are the costs and size of the light quantity adjusting device 30 reduced, but also the circular diaphragm openings (the main diaphragm opening 85 and the sub diaphragm opening 86) can be realized even when photographing a moving image by the digital video camera 100 (see FIG. 12). Therefore, it is possible to obtain a good out-of-focus image in front of and behind an object.

The first to fourth stages correspond to the diaphragm operations when the exposure value is large. In contrast, if the exposure value is small, the diaphragm operations are carried out from the fourth stage to the first stage.

2. Second Embodiment

Exemplary Appearance of Image Pickup Device

FIG. 12 is a perspective view of the digital video camera 100 serving as an image pickup device according to another embodiment of the present invention.

As shown in FIG. 12, the digital still camera 100 has a rectangular parallelepiped body 111 constituting the exterior thereof. A front panel 112 is mounted to the front portion of the body 111.

The front panel 112 has a lens opening 112a for allowing light to be incident upon the lens barrel 20 (see FIG. 3) built in the body 111. Therefore, the light is incident upon a lens 121 from the lens opening 112a, and an object image is formed by the lens 121. Then, the formed object image is photographed by the image pickup element 25 (see FIG. 4). The photographed image can be confirmed by opening a display 113 and displaying the image on the display 113.

Figure 13:
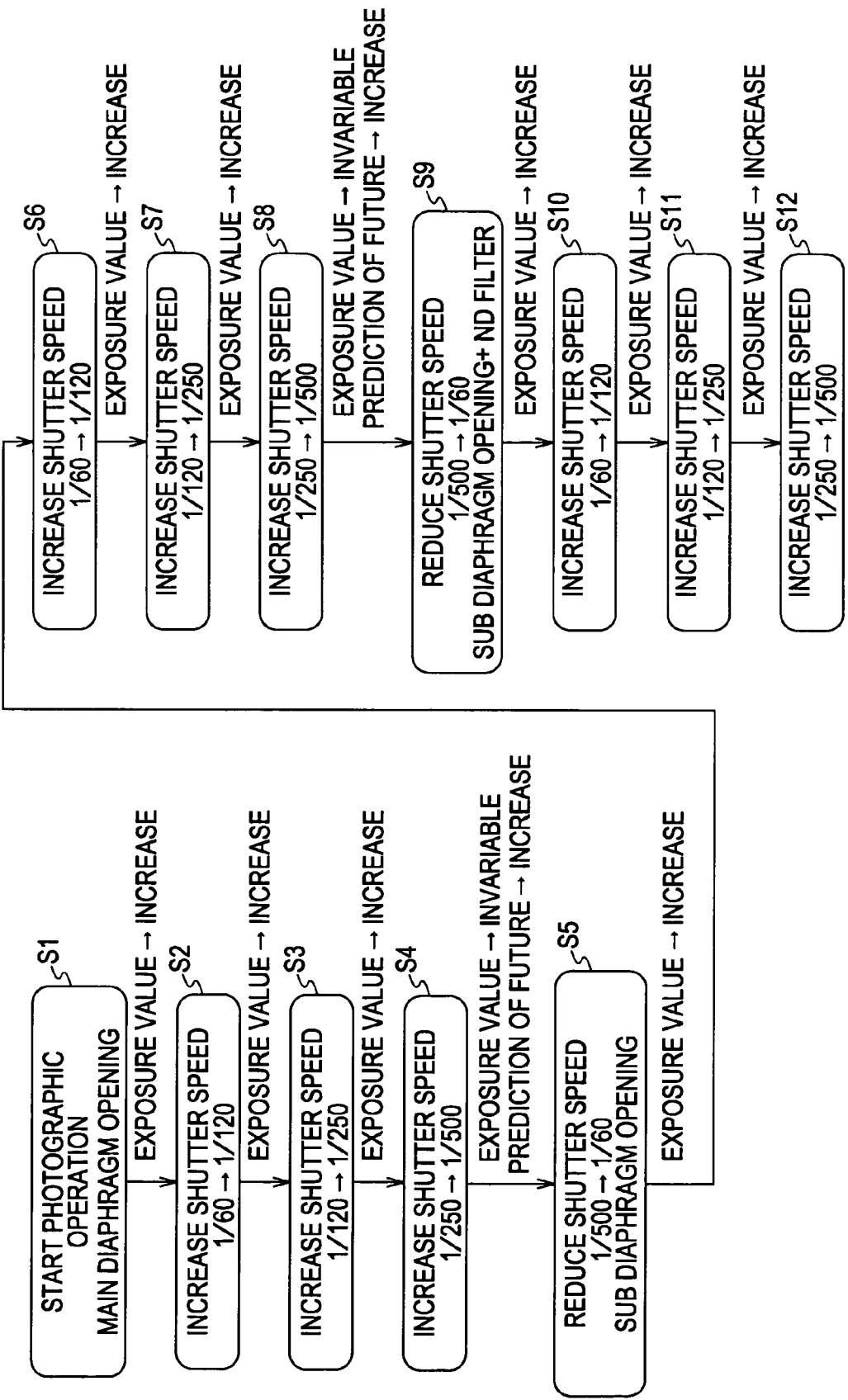
FIG. 13 is a flowchart of a method of controlling a digital video camera serving as a method of controlling an image pickup device according to an embodiment of the present invention.

FIG. 13 is a flowchart of a method of controlling the digital video camera 100 serving as a method of controlling the digital video camera according to an embodiment of the present invention.

Figure 14:
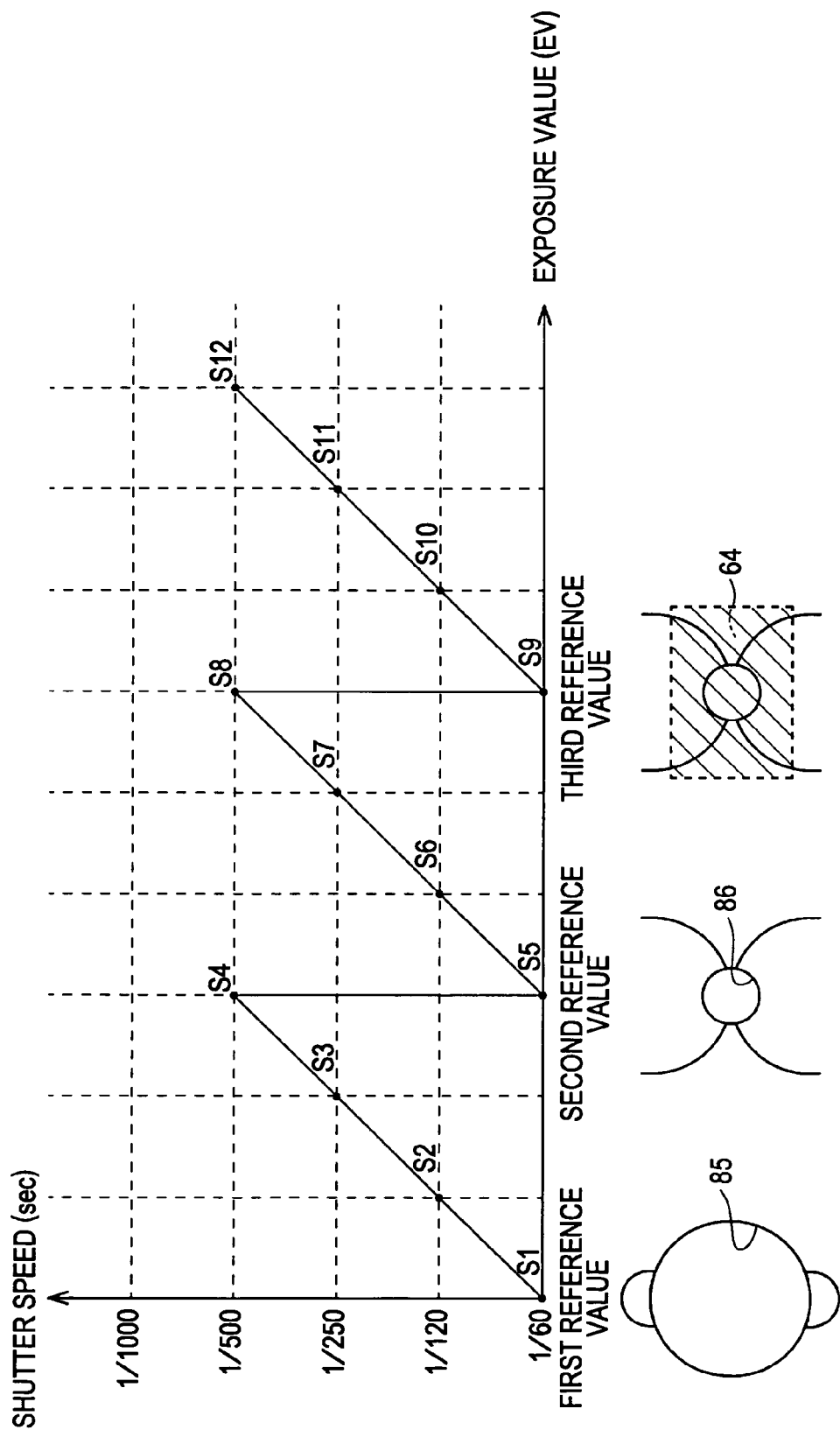
FIG. 14 is a graph of the method of controlling the digital video camera serving as the method of controlling the image pickup device according to the embodiment of the present invention.

FIG. 14 is a graph of the method of controlling the digital video camera 100 serving as the method of controlling the image pickup device according to the embodiment of the present invention.

Here, an exposure value (EV) shown in FIG. 14 indicates the quantity of light (brightness). The higher this numerical value (towards the right of the graph), the higher the brightness. This exposure value is detected by an exposure value detecting unit including the image pickup element 25, the A/D converting section 26, the camera DSP 27, and the CPU 28 (all of which are shown in FIG. 4).

As shown in Step S1 in FIG. 13 and in FIG. 14, when a photographic operation is started, the exposure value detected by the exposure value detecting unit is small and the circular main diaphragm opening 85 (see FIG. 14) is formed. The exposure value at this time is a first reference value, and the shutter speed is 1/60 sec. Therefore, by the main diaphragm opening 85, it is possible to obtain a good circular out-of-focus image from the start of the photographic operation.

Next, if the exposure value is increased and becomes greater than the first reference value, then, in Step S2, a shutter speed adjusting unit (CPU 28 shown in FIG. 4) increases the shutter speed from 1/60 sec to 1/120 sec while the main diaphragm opening 85 is maintained as it is. Then, if the exposure value is further increased, then, in Step S3, the shutter speed adjusting unit increases the shutter speed from 1/120 sec to 1/250 sec. If the exposure value is further increased, then, in Step S4, the shutter speed adjusting unit increases the shutter speed from 1/250 sec to 1/500 sec.

Accordingly, in the case where the main diaphragm opening 85 is formed, if the exposure value detected by the exposure value detecting unit becomes greater than the first reference value, the shutter speed adjusting unit changes the shutter speed from a low speed (1/60 sec) to a high speed (1/500 sec). Then, the exposure value provided when the shutter speed is 1/500 sec while the main diaphragm opening 85 is formed is defined as a second reference value. Therefore, if the exposure value becomes greater than the first reference value and is equal to or less than the second reference value, the shutter speed is adjusted between the low speed and the high speed to obtain a circular out-of-focus image by the main diaphragm opening 85.

Here, if the main diaphragm opening 85 is formed and the shutter speed is the high speed (1/500 sec), an exposure value change predicting unit (CPU 28 shown in FIG. 4) predicts that the exposure value will become greater than the second reference value in the future. Then, if the exposure value actually becomes greater than the second reference value, it becomes necessary to set the shutter speed to a higher speed (such as 1/1000 sec) or to reduce the diaphragm opening smaller than the main diaphragm opening 85.

However, if the shutter speed is increased to the higher speed, a photographed moving image loses its smoothness, as a result of which its movement becomes awkward.

If the exposure value change predicting unit predicts that the exposure value will become greater than the second reference value in the future, even if there is no change in the exposure value, the shutter speed adjusting unit sets the shutter speed from the high speed (1/500 sec) back to the low speed (1/60 sec) in Step S5. The diaphragm driving motor 51 (see FIG. 5) causes the sub diaphragm opening 86 (see FIG. 14) to be formed and prepares for the future increase in the exposure value by reducing to the sub diaphragm opening 86 from the main diaphragm opening 85.

The combination of the sub diaphragm opening 86 and the shutter speed of 1/60 sec is for when the exposure value is equal to the second reference value as with the combination of the main diaphragm opening 85 and the shutter speed of 1/500 sec. In other words, the size of the main diaphragm opening 85 and the size of the sub diaphragm opening 86 are determined so that the shutter speed can be made equal to the second reference value by such a combination.

Next, in the case where the shutter speed is the low speed (1/60 sec) and the sub diaphragm opening 86 is formed, if the exposure value detected by the exposure value detecting unit becomes greater than the second reference value, the shutter speed is increased in Step S6. More specifically, the shutter speed adjusting unit changes the shutter speed from 1/60 sec to 1/120 sec. If the exposure value is further increased, then, in Step S7, the shutter speed adjusting unit increases the shutter speed from 1/120 sec to 1/250 sec. If the exposure value is further increased, then, in Step S8, the shutter speed adjusting unit increases the shutter speed from 1/250 sec to 1/500 sec.

Accordingly, in the case where the sub diaphragm opening 86 is formed, if the exposure value detected by the exposure value detecting unit becomes greater than the second reference value, the shutter speed adjusting unit changes the shutter speed from the low speed (1/60 sec) to the high speed (1/500 sec). Then, the exposure value when the shutter speed is 1/500 sec while the sub diaphragm opening 86 is formed is defined as a third reference value. Therefore, if the exposure value becomes greater than the second reference value and is equal to or less than the third reference value, the shutter speed is adjusted between the low speed and the high speed to obtain a circular out-of-focus image by the sub diaphragm opening 86.

Next, in the case where the sub diaphragm opening 86 is formed and the shutter speed is the high speed (1/500 sec), the exposure value change predicting unit may predict that the exposure value will become greater than the third reference value in the future. In this case, for maintaining the smoothness of the photographed moving image, even if there is no change in the exposure value, the shutter speed adjusting unit sets the shutter speed from the high speed (1/500 sec) back to the low speed (1/60 sec) in Step S9.

The ND driving motor 71 (see FIG. 5) prepares for the future increase in the exposure value by covering the sub diaphragm opening 86 with the ND filter 64 as shown in FIG. 14.

The combination of the shutter speed of 1/60 sec and the state in which the sub diaphragm opening 86 is covered with the ND filter 64 is for when the exposure value is equal to the third reference value as with the combination of the sub diaphragm opening 86 and the shutter speed of 1/500 sec. In other words, the density of the ND filter 64 is determined so that the shutter speed is equal to the third reference value by such a combination.

Next, in the case where the shutter speed is the low speed (1/60 sec) and the sub diaphragm opening 86 is covered with the ND filter 64, if the exposure value detected by the exposure value detecting unit becomes greater than the third reference value, the shutter speed is increased in Step S10. More specifically, the shutter speed adjusting unit changes the shutter speed from 1/60 sec to 1/120 sec. If the exposure value is further increased, then, in Step S11, the shutter speed adjusting unit increases the shutter speed from 1/120 sec to 1/250 sec.

If the exposure value is further increased, then, in Step S12, the shutter speed adjusting unit increases the shutter speed from 1/250 sec to 1/500 sec.

Accordingly, by positively making use of the shutter speed in exposure control, it is possible to achieve a wide exposure value range including three exposure values realized by the state in which the main diaphragm opening 85 is formed, the state in which the sub diaphragm opening 86 is formed, and the state in which the sub diaphragm opening 86 is covered with the ND filter 64. Therefore, it is possible to carry out the exposure control using a circular diaphragm opening with little deterioration in diffraction, and to increase resolution property to obtain an image having a good circular out-of-focus image in front of and behind an object. In addition, while the circular diaphragm opening is maintained, it is possible to carry out smooth exposure control, so that a proper moving image can be photographed.

The controlling method shown in FIGS. 13 and 14 can be used not only in the digital video camera 100 (see FIG. 12), but also in, for example, the digital still camera 10 (see FIGS. 1 and 2).

Although the embodiments of the present invention are described above, the present invention is not limited to the above-described embodiments, so that various modifications can be made. For example, although, in the embodiments, the digital still camera 10 and the digital video camera 100 are given as examples of the image pickup device, the present invention is also widely applicable to other image pickup devices such as a cellular phone with a camera.

What is claimed is:

1. A method of controlling an image pickup device including an image pickup lens; a barrel body that accommodates the lens; a plate having a circular opening portion for allowing light from the lens to be incident thereupon, the plate being disposed perpendicularly to an optical axis of the incident light from the opening portion; an image pickup element disposed rearwardly of the plate in an incidence direction on the optical axis; an upper diaphragm blade and a lower diaphragm blade, each blade being provided so as to be capable of reciprocating along a surface of the plate; diaphragm blade driving means for reciprocating the upper diaphragm blade and the lower diaphragm blade in opposite directions to each other; a neutral density filter provided so as to be capable of reciprocating along the surface of the plate, the neutral density filter reducing the quantity of light passing therethrough; neutral density filter driving means for reciprocating the neutral density filter; exposure value detecting means for detecting an exposure value; exposure value change predicting means for predicting a change in the exposure value in the future on the basis of a change in a past exposure value detected by the exposure value detecting means; and shutter speed adjusting means for adjusting a shutter speed between a low speed and a high speed; wherein the upper diaphragm blade has a semicircular upper main opening and a semicircular upper sub opening, the upper main opening having a size corresponding to that of the upper half of the opening portion, the upper main opening opening upward, the upper sub opening being formed at a top portion of the upper main opening, the upper sub opening having a size that is smaller than that of the upper main opening, the upper sub opening opening upward; wherein the lower diaphragm blade has a semicircular lower main opening and a semicircular lower sub opening, the lower main opening having a size corresponding to that of the lower half of the opening portion, the lower main opening opening downward, the lower sub opening being formed at a bottom portion of the lower main opening, the lower sub opening having a size that is the same as that of the upper sub opening, the lower sub opening opening downward; wherein the diaphragm blade driving means is formed so as to be capable of switching between a state in which a circular main diaphragm opening is formed by the upper main opening and the lower main opening with the optical axis being the center and a state in which a circular sub diaphragm opening that is smaller than the main diaphragm opening is formed by the upper sub opening and the lower sub opening with the optical axis being the center; and wherein the neutral density filter driving means is formed so as to be capable of switching between a state in which the sub diaphragm opening is exposed and a state in which the sub diaphragm opening is covered with the neutral density filter, the controlling method comprising the steps of:

if the exposure value detected by the exposure value detecting means is equal to or less than a first reference value, forming the main diaphragm opening by the diaphragm blade driving means;

in the case where the main diaphragm opening is formed, if the exposure value detected by the exposure value detecting means becomes greater than the first reference value and is equal to or less than a second reference value, changing the shutter speed from the low speed to the high speed by the shutter speed adjusting means;

in the case where the main diaphragm opening is formed and the shutter speed is the high speed, if the exposure value change predicting means predicts that the exposure value will become greater than the second reference value in the future, setting the shutter speed from the high speed back to the low speed by the shutter speed adjusting means and forming the sub diaphragm opening by the diaphragm blade driving means;

in the case where the shutter speed is the low speed and the sub diaphragm opening is formed, if the exposure value detected by the exposure value detecting means becomes greater than the second reference value and is equal to or less than a third reference value, changing the shutter speed from the low speed to the high speed by the shutter speed adjusting means;

in the case where the sub diaphragm opening is formed and the shutter speed is the high speed, if the exposure value change predicting means predicts that the exposure value will become greater than the third reference value in the future, setting the shutter speed from the high speed back to the low speed by the shutter speed adjusting means and covering the sub diaphragm opening with the neutral density filter by the neutral density filter driving means; and in the case where the shutter speed is the low speed and the sub diaphragm opening is covered with the neutral density filter, if the exposure value detected by the exposure value detecting means is greater than the third reference value, changing the shutter speed from the low speed to the high speed.

* * * * *